Jan. 8, 1924.
G. S. OWEN
1,480,462
EMERGENCY AXLE FOR MOTOR VEHICLES
Filed July 22, 1918    2 Sheets-Sheet 2
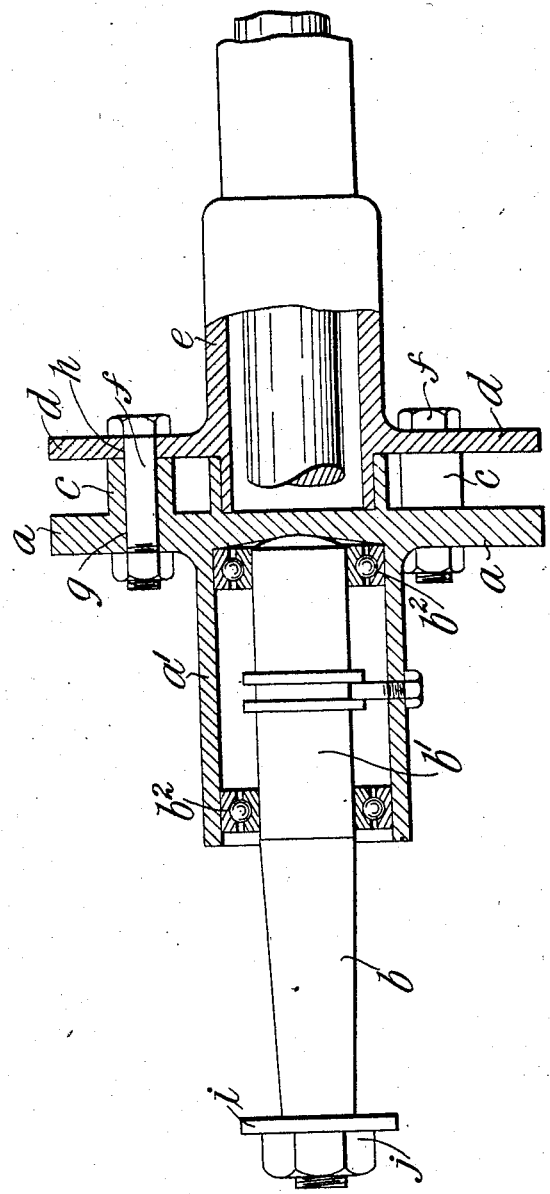
INVENTOR
GEORGE STRANGE OWEN
By
Attorney Patented Jan. 8, 1924.

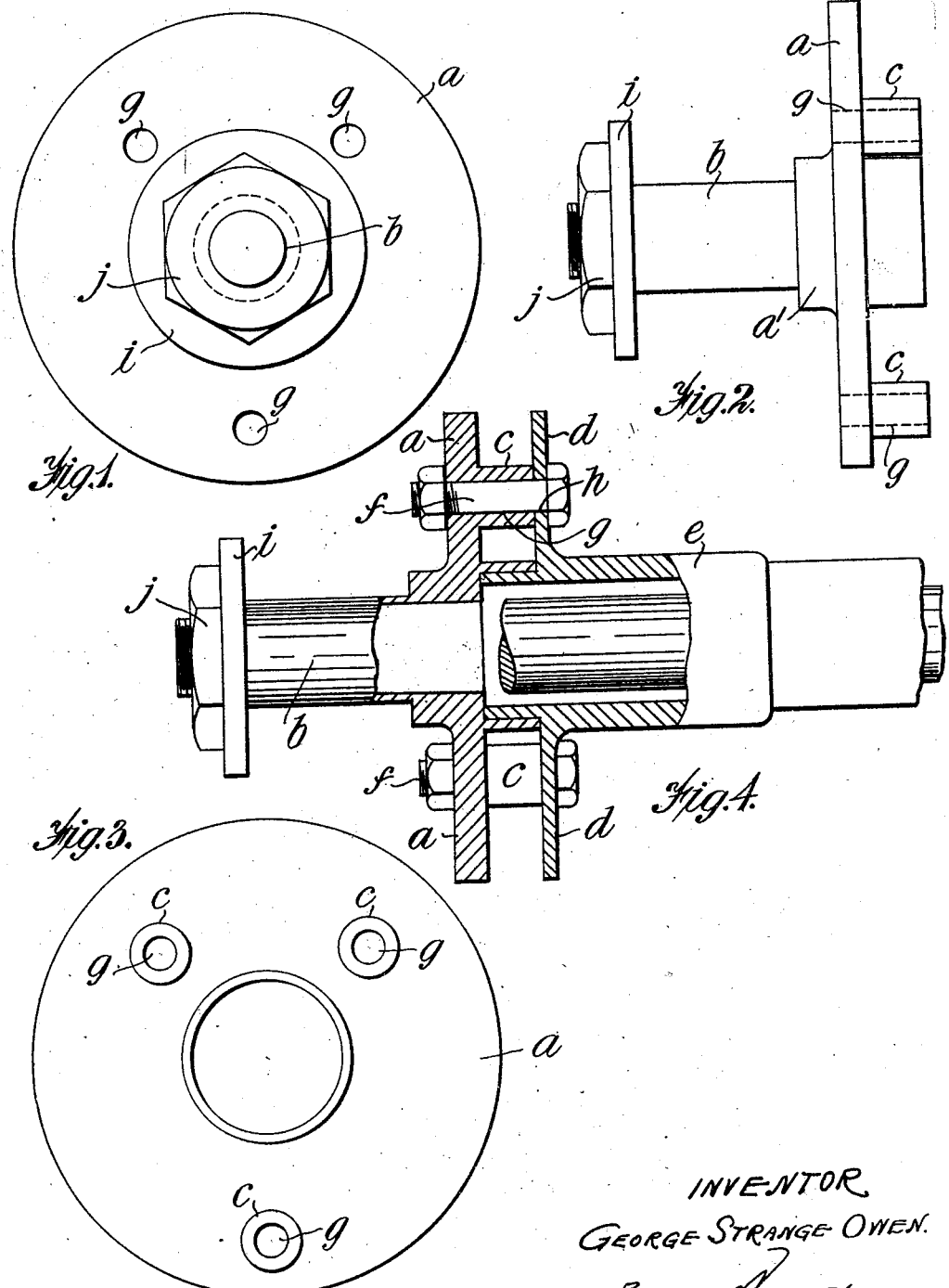

1,480,462

UNITED STATES PATENT OFFICE.

GEORGE STRANGE OWEN, OF CHELSEA, LONDON, ENGLAND.

EMERGENCY AXLE FOR MOTOR VEHICLES.

Application filed July 22, 1918. Serial No. 246,108.

(GRANTED UNDER THE PROVISIONS OF THE ACT OF MARCH 3, 1921, 41 STAT. L., 1313.)

*To all whom it may concern:*

Be it known that I, GEORGE STRANGE OWEN, a subject of the King of Great Britain and Ireland, and a resident of Chelsea, county of London, England, have invented a certain new and useful Improvement in Emergency Axles for Motor Vehicles (for which I have obtained a patent in Great Britain No. 114,087, dated the 13th day of July, 1917), of which the following is a specification.

The present invention relates to temporary axles which, in the event of the breakage of the rear axle of a motor road vehicle, can be fitted to the axle housing, thus permitting, a wheel having been mounted on the temporary axle, of the vehicle being towed home.

With this object in view, the invention consists in a temporary axle constituted by a disc adapted to be detachably and non-rotatably secured to the flange of the housing of the rear axle, and provided with a short axle, which short axle may be solid or hollow, for the reception of a road wheel, and means on said short axle to prevent said wheel coming off.

For a clear understanding of the present invention, reference is to be had to the following description and accompanying sheets of drawings, in which:—

Figures 1, 2 and 3 are, respectively, front, side and back view of a device constructed in accordance with the invention.

Figure 4 is a longitudinal sectional view showing the application of the device to the rear axle housing.

Figure 5 is a sectional plan view showing a modified arrangement of the device.

Like letters of reference indicate corresponding parts in the several figures.

In carrying out the invention and referring first to Figures 1 to 4, a disc $a$ is provided on its front face with a short solid or hollow axle $b$ extending from the boss $a'$ of said disc $a$, and on its rear face with three lugs or distance pieces $c$, which lugs or distance pieces $c$ are bored out for the passage of bolts, by means of which said disc is temporarily secured to the housing of the rear axle.

In use, the disc $a$ is attached to the flange $d$ of the axle housing $e$—Figure 4—by means of the bolts $f$ passed through the bores $g$ of the lugs or distance pieces and taking in the usual three bolt holes $h$ in the housing flange, the lugs or distance pieces giving the proper spacing apart of the disc and the housing flange. The wheel (an auxiliary wheel, not shown in the drawings, and provided with anti-friction or other bearings) is then slipped on the short axle $b$ of the disc $a$ and locked against slipping off said axle by any suitable means, such as washer $i$ and nut $j$, and the damaged vehicle can be towed away at any speed.

Referring now to the arrangement shown in Figure 5, which enables the car's wheel, after the same has been removed from the broken-off part of the axle, to be used instead of employing an auxiliary road wheel as in the previous arrangement, it will be observed that in this arrangement of the device, the short axle $b$, instead of forming part of the disc $a$ and its boss $a'$, is now made as a separate axle and is rotatably mounted by its inner end $b'$ in ball bearings $b^2$ in the boss $a^2$ of said disc $a$, said boss for this purpose being made longer, and the wheel (not shown in the drawings) is fixedly secured on to the front part $b^2$ of the axle so as to rotate therewith, said wheel being locked in position by washer $i$ and nut $j$ or other suitable means.

Although the device has been designed more especially for use with Ford cars, yet said device can be used with other vehicles, and, further, the device may be attached to the axle housing by clips or other suitable devices.

Further, if the temporary axle is intended for use not only with a broken axle but also for use with a faulty or locked differential, then the disc and its short axle are bored through for the passage of the end of the locked axle, two of such temporary axles being employed to take the rear wheels.

Having now described my invention, what I claim as new and desire to secure by Letters Patent of the United States is:—

An auxiliary axle unit comprising a body including an axle-boss, and an integral circular flange portion having tubular offset fastening receiving and spacing legs at the side opposite the boss and arranged in circumferentially spaced relation, and fastening bolts arranged in the tubular leg portions for attaching the unit to the housing flange of the axle construction.

In testimony whereof I have affixed my signature this 1st day of July, 1918.

GEORGE STRANGE OWEN.